358-190. XR 2,796,520 SR OSS REFERENCE SEARCH ROOM

June 18, 1957 A. KREITHEN 2,796,520

POWER SUPPLY FOR PORTABLE RECEIVER

Filed Dec. 27, 1951 3 Sheets-Sheet 1

INVENTOR:
ALEXANDER KREITHEN,

BY Homer R. Montague
ATTORNEY

INVENTOR:
ALEXANDER KREITHEN,

BY Homer R. Montague
ATTORNEY

June 18, 1957 A. KREITHEN 2,796,520
POWER SUPPLY FOR PORTABLE RECEIVER
Filed Dec. 27, 1951 3 Sheets-Sheet 3

INVENTOR:
ALEXANDER KREITHEN,
BY Homer R. Montague
ATTORNEY

United States Patent Office 2,796,520

Patented June 18, 1957

2,796,520

POWER SUPPLY FOR PORTABLE RECEIVER

Alexander Kreithen, Washington, D. C.

Application December 27, 1951, Serial No. 263,605

2 Claims. (Cl. 250—27)

Figure 1:
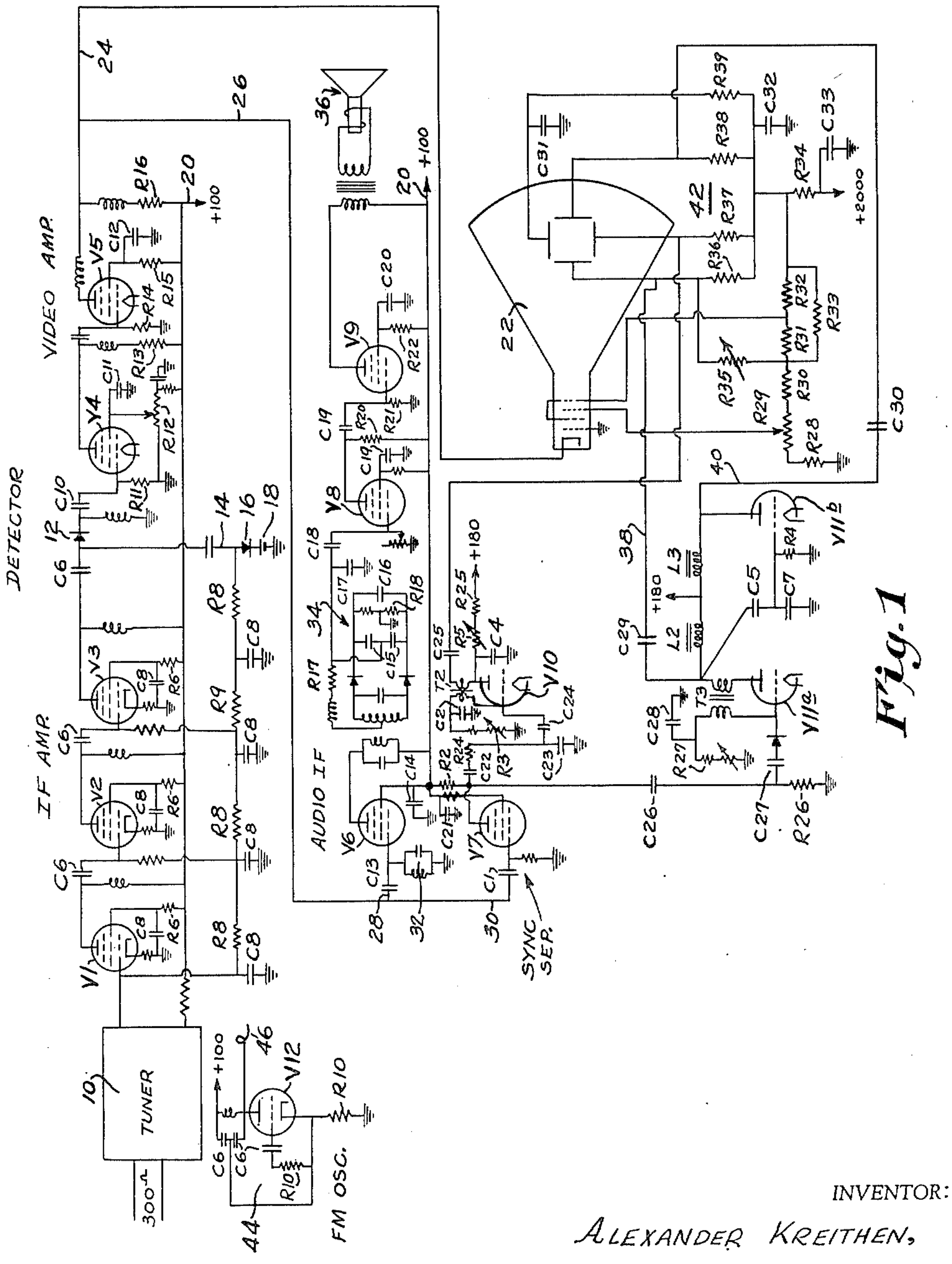

This invention pertains to television receiving apparatus, and particularly to improvements in such apparatus which enable a complete television receiver to be reduced in size and weight to the point where a truly portable instrument is practical.

It has, of course, been proposed by others to provide television receivers of relatively small size and weight, and which are in a sense portable in that they can readily be carried from place to place. All such receivers, however, have been dependent upon a local supply of electrical power, such as standard 115 volt alternating current lines, to provide the power requirements of the set. The present invention, by way of contrast, provides for the first time a television receiver, including provision for reception of the present standard frequency-modulated sound transmissions, in which the reductions in size and weight are such as to permit the incorporation in the receiver of a completely self-contained electrical power supply adequate for several hours of operation without recourse to external power lines. The achievement of this result involves, in addition to the employment of advanced design techniques for the receiver itself to accomplish size and weight reductions, the use of novel combinations and circuitry to ensure a substantial saving in the power requirements of the receiver; for it would not solve the portability problem merely to reduce size and weight if the power requirements of the resulting set were so large that a self-contained power supply were inadequate or could be provided only by batteries or the like so bulky that the accomplishment of reduced size and weight of the receiver components was neutralized by the size and weight of the power supply.

It is therefore a principal object of this invention to provide a design and construction for television, or television and radio, receivers which enable a completely self-contained and self-powered receiver to be built of such small size and weight that a truly portable instrument is possible.

A further object of the invention is to provide a television receiver in which the power requirements of the entire circuit are substantially reduced as compared with prior art receivers of the same functional capabilities, whereby a self-contained power source of reasonable size and weight may be employed for operation.

Still another object of the invention is to provide a receiver of the above type in which provision is made for the use of a self-contained power source which is rechargeable from ordinary house lighting circuits, whereby after a period of extended use, the battery may be brought to a recharged condition quickly and economically and without removing it from the receiver housing.

Yet another object of the invention is to provide, in a self-contained and self-powered television receiver, arrangements whereby the instrument may be operated directly from conventional lighting and power circuits such as house circuits, when such a connection is available, whereby the charged condition of the internal battery or the like is maintained until such time as operation at locations remote from such power lines is desired. In other words, the receiver of the present invention is capable of either normal alternating current operation or battery operation at will, and also provides for recharging of the battery from power lines when required.

While the general arrangement of the receiver of this invention follows known practices with respect to the treatment of the incoming signal to provide the necessary television sound and picture outputs, and also regular FM sound output, several important changes in the conventional arrangement have been incorporated. These are directed not only to a reduction in the number of tubes and other components usually employed, by means of improved circuitry, but to a substantial reduction in the total power required to be supplied for operation. Some power is of course saved merely because of the increased efficiency of individual stages and portions of the receiver, but the present invention provides even further power savings by reason of the inherent design of portions of the circuit. Specifically, it has been made possible to employ both filamentary and heater-type cathodes powered from the same source, with a view to avoiding design limitations heretofore encountered with respect to the operating voltages thereof, and whereby the most desirable tube may be employed in each stage.

A further specific object of the invention is to provide improved vertical and horizontal deflection circuits, capable of furnishing the required amplitudes of voltages for operation of a cathode ray tube with a minimum number of tubes.

Still another object of the invention is to provide a novel circuit for accomplishing the separation of the synchronizing pulses of the video signal for control of the deflection oscillators, and for clipping said pulses, all in a single tube or stage, with consequent savings in components and power requirements.

Figure 2:
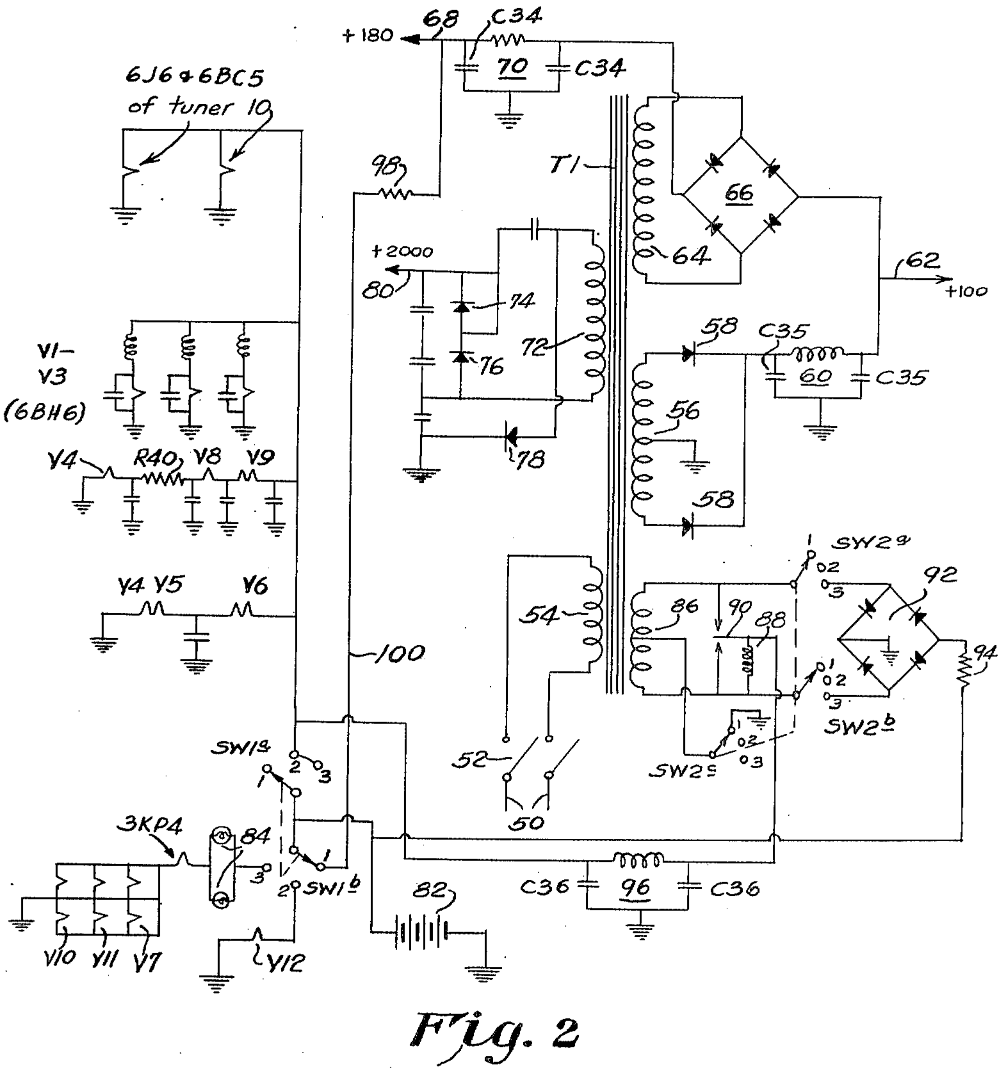
Figure 3:
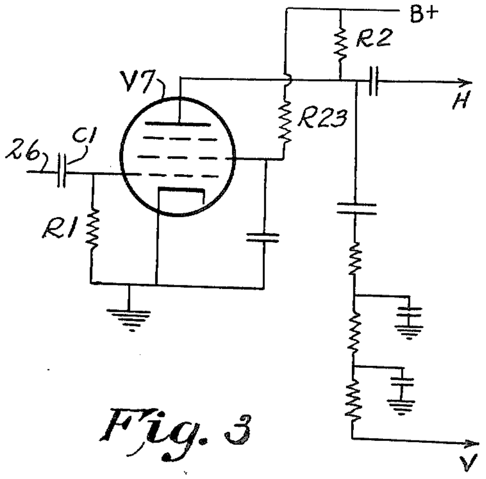
Figure 4:
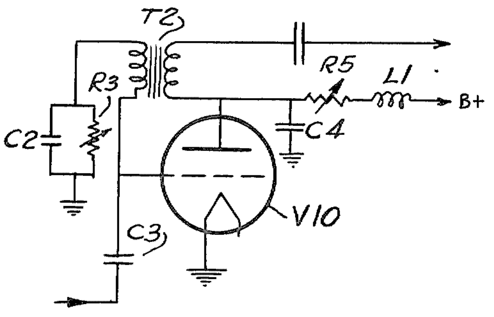
Figure 5:
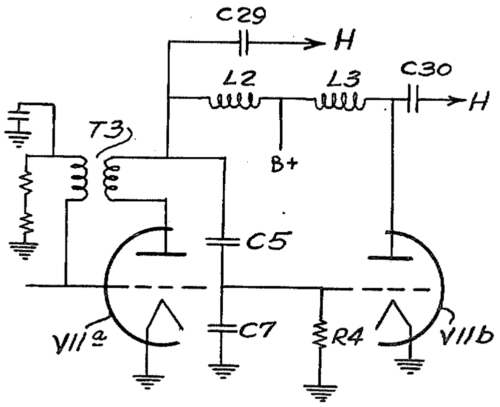
Figure 6:
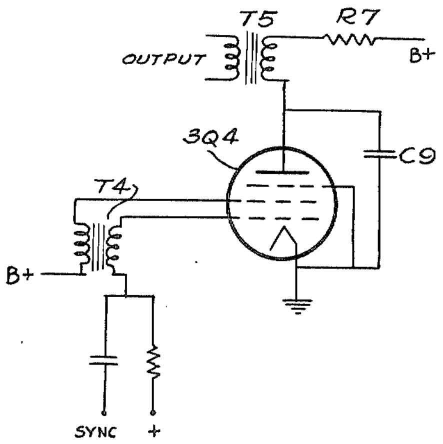

The above and other objects and advantages of the invention will best be understood from the following detailed specification of a preferred form of portable television and FM receiver incorporating the principles of the invention, said specification being read in conjunction with the appended drawings forming a part hereof, and in which:

Fig. 1 is a schematic diagram of the principal parts of such a receiver, the diagram being simplified by the omission of the parts relating to the supply of the heater or filament and plate potentials, Fig. 2 is a schematic diagram of the portions of the receiver pertaining to the provision of the necessary filament, heater and plate current supplies, together with the parts relating to the self-contained battery and arrangements for operation of the set from A. C. or battery, and for recharging of said battery, Fig. 3 is an enlarged schematic diagram of the combined separator for deriving synchronizing pulses from the composite video signal, and for clipping such pulses, Fig. 4 is an enlarged schematic of the novel vertical sweep generator of Fig. 1, Fig. 5 is a similar view of the novel horizontal sweep generator of Fig. 1, and Fig. 6 shows a novel electron-coupled oscillator or sweep generator.

For ready reference and understanding of the invention, the common or functional names for the various parts of the complete circuit have been generally designated in Fig. 1 by means of legends, and the general operation of the various parts will now be described briefly, after which the special and novel differences from previous structures will be pointed out in detail.

Incoming television or frequency-modulated signals are received by a suitable antenna, not shown, and applied to a conventional form of tuner 10, arranged to enable the various bands or channels to be selected and amplified. This known tuning device also includes a tunable local oscillator whose output is caused to beat against the amplified incoming signal in a mixer stage in the known manner of heterodyne reception. The intermediate frequency output signal of tuner 10 of course contains, in the case of television reception, signals corresponding both to the amplitude-modulated video or picture information received, and to the frequency-modulated sound information accompanying the picture signals. This composite output wave is then applied to a conventional intermediate frequency (I. F.) amplifier having a plurality of stages such as the cascaded amplifier tubes V1, V2 and V3. As is conventional, first detection of the video signals has occurred in the tuner 10, and the amplified I. F. signal leaving tube V3 is applied to the second detector comprising a diode rectifier 12, whose output is amplified in the first and second video amplifier tubes V4 and V5. A known form of automatic gain control is applied to the intermediate frequency amplifier stages, here shown as a feedback connection 14 and rectifier 16, the resulting automatic gain control (AGC) direct-current voltage being applied to the grids of the respective I. F. amplifiers V1, V2 and V3. Suitable bias in order to delay the action of the AGC circuit on weak signals is provided in any desired manner, such as by a small (1.5 volts) bias source 18 inserted between rectifier 16 and ground.

Plate and screen grid potentials for the tubes V1 to V5, as well as for the tubes incorporated in tuner 10, are provided by a connection 20; the source of this potential will be detailed in connection with Fig. 2 of the drawings.

The parts described so far provide the usual form of composite amplified signal incorporating the entire video signal, and the 4.5 megacycle sound intermediate frequency signal, although it is to be understood that the invention does not require the use of this standard value for the sound I. F. In any event, the video signals pass directly to the cathode of the picture tube 22, via a connection 24, it being understood that suitable trap circuits or equivalent means are employed to prevent the sound information from modulating the beam of the picture tube 22. Since high signal amplitude in the video band represents low beam brightness at the cathode ray picture tube, and since the video output amplifier V5 provides a positive-going signal, the direct connection to the cathode of the picture tube (whose control grid is grounded) provides a proper relationship between received signal and reproduced picture brightness.

The composite output signal of the last video amplifier V5 is also conducted, through a connection 26, to the sound I. F. amplifier tube V6, and also to a novel combined synchronizing pulse separator and clipper comprising tube V7. The connections to the control grids of these tubes are made through blocking condensers 28 and 30 respectively; a 4.5 megacycle trap comprising C32 and the inductance 32 is connected so as to divert from the audio channel frequencies of other values, in a known manner. The output of the audio I. F. amplifier tube V6 is applied to a conventional discriminator 34, and the resulting audio-frequency signal (representing the sound portion of the composite television signal) is amplified by conventional stages V8 and V9 and applied to any desired form of transducer, shown as a loudspeaker 36.

As stated, the composite signal on conductor 26 has also been applied to the tube V7, which combines the function of separating from such signal the vertical and horizontal synchronizing pulses, and the clipping or limiting of these pulses as to amplitude in order to exclude extraneous noise pulses from effecting or triggering the horizontal and vertical deflection signal generators. The present circuit utilizes a novel design for this purpose, which will be described in detail hereinafter. For the present, it is sufficient to note that the vertical pulses (frame frequency pulses) are derived from the sync separator V7 and applied to a blocking oscillator tube V10, whose output is in turn conveyed to the vertical deflection plates of the electrostatically deflected cathode ray picture tube 22. Also, the horizontal (line frequency) pulses are applied to trigger a novel form of push-pull horizontal deflection generator comprising a tube whose separate triode sections are designated **V11*a* and V11*b*. The push-pull output sweep frequency of this generator is applied, by conductors 38 and 40 to the horizontal deflection plates of the picture tube 22. The various centering and focusing adjustments for the picture tube, and the necessary potentials for its electrodes, are provided by a network generally designated by numeral 42 supplied with a high D. C. potential (e. g., 2000 volts) obtained in a manner to be described. An intermediate anode potential (180 volts) derived also in a manner to be described, is provided for the deflection generator tubes V10 and V11*a*, *b***.

The above description indicates how the necessary functions for television reception are accomplished, and points out the particular components for which novetly is to be claimed, the details of whose inventive aspects will be elaborated below. In passing, it should also be mentioned that the tuner 10 employed is preferably of the type which tunes continuously through all of the presently-assigned television channels; that is, those in the so-called lower frequency range (channels 2 to 6) and those in the higher frequency range (channels 7 to 13). Between these two sets of television channels presently lies the so-called FM band, upon which are broadcast frequency-modulated audio signals, and if desired, tuner 10 may be of a type which incorporates provision for tuning these latter channels as well. If so, and to increase the utility of the present receiver by making it possible to receive these FM audio broadcasts, a separate and very simple oscillator, generating a signal of 4.5 megacycles, may be provided, as indicated by numeral 44, comprising an oscillator tube V12 and suitable output coupling loop or "gimmick" 46 which is inductively related to a suitable conductor on the I. F. strip comprising tubes V1 to V3. This oscillator may be switched on and off in a manner to be described below, and its use provides for greatly reduced battery drain when only FM sound signals are desired to be received, since tubes V7, V10 and V11, and the picture tube 22, need not be energized at such times.

Fig. 2 of the drawings shows schematically the details of a novel form of combination power supply satisfying the objects of the present invention, and will now be described. This power supply furnishes all of the necessary voltages and currents required for operation of the set, as well as for the recharging of the battery used during portable operation. The power supply utilizes a single transformer T1, and when the set is to be operated from normal 115 volt house lighting circuits, the 115 volt A. C. line is connected through conductors 50 and a power switch 52 to a primary winding 54, energizing the transformer and providing a plurality of voltages suitable for rectification and use as plate voltages. Specifically, a winding 56 having its center tap grounded is connected to rectifiers 58 and thence through a ripple filter 60 from which a connection 62 provides approximately 100 volts for the plates and screen grids (the latter through suitable dropping resistors indicated in Fig. 1) of tubes V1 to V9 and the FM oscillator V12. In other words, connection 62 is connected to conductor 20 of Fig. 1. Another winding 64 of the transformer provides through the rectifier 66 an additional D. C. voltage which is connected in series with that provided by winding 56, and is of sufficient value to provide a total voltage of the order of 180 volts at connection 68 for connection to the plates of the deflection generator tubes V10 and V11. An additional ripple filter 70 is connected from this 180 volt output to ground for the usual purpose.

High voltage for the second anode or accelerator electrode of picture tube 22 is furnished by another winding 72 of transformer T1, the alternating current output of which is rectified in a voltage tripler circuit of known form comprising half wave rectifiers 74, 76 and 78 and suitable storage capacitors, the output being available at conductor 80 for connection to the network 42 of Fig. 1 as indicated thereon. As here shown, the picture tube is an electrostatically focused and deflected tube known as RTMA type 3KP4, and the accelerator voltage requirement of approximately 2,000 volts for such tube is readily obtained by the tripler circuit without recourse to the special generator circuits required for larger tubes.

The low voltage direct current for heating the filaments and cathode heaters of the vacuum tubes of the set is furnished from a six volt rechargeable battery of the silver type, shown in Fig. 2 by numeral 82, one terminal being grounded and the other leading to the movable wiper arms of a pair of ganged switches SW1*a* and SW1*b*. When the wiper arm of switch SW1*a* is in the position shown in Fig. 2 ("off"), the battery is disconnected from all of the heaters. When the same switch is moved to contact 2 (FM) or 3 (TV), the heaters or filaments of the tubes in the tuner 10 and tubes V1 to V6, V8 and V9 are energized, since all of these tubes are required for either FM or television reception. The second switch SW1*b* operates to connect the battery to the heater of FM oscillator V12 when in position 2 (FM), and when in position 3 it disconnects this heater and energizes the heaters of the picture tube 22, sync separator V7, and the horizontal and vertical deflection generators V11 and V10.

A novel feature of the filament or heater supply is the provision for reducing the heater current drain of the 3KP4 picture tube. Since the electric gun structure in this tube is very similar to that used in larger tubes, for economic reasons the same heater has been incorporated in this gun assembly. In the set of this invention there is no need to use all of the emission of which such a heater is capable, consequently the heater voltage is dropped to 4.5 volts instead of 6 volts. This is accomplished by connecting the proper number of 1.5 volt filaments of the other tubes so that the 4.5 volts are obtained across the cathode ray tube filament.

In order to prevent burnout of the 1.5 volt filaments when the set is first turned on, a set of pilot lamps 84 (2.5 volt rating) is connected in series with both the cathode ray tube filament and the 1.5 volt filaments. This is necessary because the large thermal mass of the cathode ray tube filament causes it to have a low resistance for a longer period of time than the light 1.5 volt filaments. To limit the surge of current while the CRT filament is cold, an appropriately chosen pilot lamp combination is used in series with the filament circuit. Such pilot lamps have low thermal mass and a high change of resistance versus current, and consequently they serve to limit the surge current to a value that protects the 1.5 volt filamentary tubes.

Another feature of this arrangement is that the filaments of the 1.5 volt tubes V7, V10, V11 that are not necessary for FM operation are chosen for this CRT voltage dropping operation. Hence by simply switching off the 6 volt supply to this combination, a considerable saving of battery drain is achieved on FM operation.

A second switch, having ganged sections SW2*a*, SW2*b* and SW2*c*, is provided to permit choice of operation as among battery energization of the plate and screen voltage supplies, alternating current operation thereof, or recharging the battery. When this switch is in its position 1, as shown in Fig. 2, and switch SW1*a* is in position 2 or 3 the center tap of a winding 86 of transformer is grounded through switch SW2*c*, and a circuit is completed from the battery 82, through the coil 88 of a conventional vibrator 90 and one-half of winding 86. The reed of the vibrator is attracted against the lower vibrator contact, which shunts out the coil 88 and allows the reed to rebound against the upper contact. Thus, battery voltage is applied to the upper and lower halves of winding 86 in rapid succession, ennergizing this winding to provide exciting flux for the transformer and proper output voltages for the high voltage windings 56, 64 and 72. It will be understood that the A. C. or power line connection is interrupted at switch 52, or a suitable mechanical interlock may be provided to make this interruption of the power circuit automatic.

In order to prevent conducted interference (from the arcing at the vibrator contacts) from affecting operation of the receiver at times of battery operation, a suitable filter 96 is connected as shown, and the vibrator and power supply are suitably shielded to prevent radiated interference from reaching the sensitive circuits of the receiver.

The same winding 86 which is used to excite the transformer for battery operation is also employed to recharge the battery from the power line when necessary. Thus, when switch SW2*c* is moved to position 3, the ground on the center tap of winding 86 is broken, and the switch sections SW2*a* and SW2*b* connect the ends of this winding to a full-wave bridge type rectifier 92, whose output is connected to the ungrounded terminal of battery 82 by any suitable connecting lead. A ballast resistor 94 limits the charging current to the safe value for a discharged battery.

It will be observed that whenever switch 52 is "on," plate supply voltage appears at lead 68. When switch SW1 is in its charge position and the set is then not in use, provision is made for connecting lead 68 through a suitable resistor 98 and connector 100 to switch point 1 of SW1*b*, and thence to battery 82. This maintains a small additional charging current to the battery under such conditions and at the same time prevents excessive voltage from being applied to the electrolytic capacitors C34, C34.

It will be seen from the above that the invention provides for a complete portable television and frequency modulation receiver operable at will from either conventional power lines or from an internal rechargeable battery, and includes built-in provision for recharging said battery from a conventional power line when necessary. An actual physical embodiment of the invention constructed in accordance with the teaching of this specification had a total weight, including a battery capable of operating the same for a four-hour period in portable operation, of approximately 21 pounds; the same set, equipped with an eight hour battery, weighed 27 pounds; the respective cubic volumes of these two arrangements were 0.52 and 0.58 cubic feet.

Specific reference will now be made to the individual circuit portions which in themselves constitute departures from prior art television receiver design:

*Combination sync separator and pulse clipper*

This circuit, shown in its connections to the remainder of the complete circuit in Fig. 1, is drawn to larger scale in Fig. 3, to which reference is now made. A single tube V7, of the pentode type, is utilized both to separate the pulse signals from the composite video signal (in conjunction with suitable passive filter components to be described) and to provide an adequate degree of clipping of the synchronizing pulses to eliminate false triggering of the deflection generators by noise received along with the composite video signal.

To this end, tube V7 is operated at zero initial bias, and the composite signal received over conductor 26 is applied to its control grid across a combination of condenser C1 and resistor R1 whose values are chosen to provide a time constant which is large compared to the length of a blanking interval. The positive-going sync pulses from lead 26 charge condenser C1 (electrons flowing in the grid circuit), and during blanking intervals this charge leaks off through resistor R1 at a slow rate, developing an essentially steady bias voltage across the resistor R1, which prevents flow of plate current except for the most positive values of the composite signal, which correspond to the sync pulses. Resistor R2 provides an impedance which limits pulses (e. g., noise pulses) which are larger than the synchronizing pulses to essentially the level of said synchronizing pulses. The plate voltage applied to V7 is adjusted by means of the screen voltage so that for zero bias the actual plate voltage is at the knee of the pentode curve; consequently the positive pulses appear in the output circuit as negative pulses of constant amplitude in the negative direction. Since the tube develops a large grid bias under these conditions of operation by virtue of grid rectification of the sync pulses, the video information in the signal applied to the control grid will be in the cut-off region of the tube, which is operated at a relatively low plate voltage supply so that the height of the sync pulses in the negative direction is limited. Thus, a single tube of the pentode type is able to perform the function of separating all of the sync pulses from the video information, and maintaining them at approximately constant level.

The separation of the vertical synchronizing pulses from the horizontal is accomplished in a conventional manner, by means of filter or time-constant circuits associated with the respective input circuits of the vertical and horizontal generator tubes V10 and V11, as will be clear from an inspection of these circuits in Fig. 1.

*Vertical sweep generator*

The circuits associated with the vertical sweep generator in Fig. 1 are shown more clearly in Fig. 4 of the drawings; referring to this figure, there is illustrated a sweep generator which provides an adequate voltage for the vertical deflection of the picture tube while drawing a minimum current from the power supply. The tube V10 employed is preferably one half of a battery operated triode such as the RTMA type 3A5. The generator is generally similar to known blocking oscillators in that it employs the transformer T2 to provide sharp pulses of high current amplitude. The free running time of the oscillator is determined by the time constant of the input circuit components C2 and R3, which is of course adjusted to correspond with the periodicity of the vertical (framing) pulses; conventionally 60 per second. The synchronizing pulse is shown as applied to the grid of this tube (through condenser C3), but control could equally well be exercised by applying such signal to timing condenser C2 or by applying a negative pulse to the plate of the tube. The large current pulses produced are used to discharge the plate capacitor C4 connected through an inductance L1 to the plate supply which is shown as having a value of 180 volts; due to the large plate current pulse produced by the blocking oscillator, a relatively large capacitor can rapidly be discharged to within a few volts of ground potential.

The energy stored in the large inductance L1 is then used to charge the capacitor C4 in a linear fashion to provide a sawtooth of voltage, the amplitude of which will be approximately twice the supply voltage, and whose linearity will be sufficient for direct use in controlling the vertical deflection in a picture tube such as the 3KP4 employed. Circuit constants suitable for use in this portion are given in the tabulation at the end of this specification.

*Horizontal sweep generator*

The circuit portions pertaining to horizontal sweep shown in Fig. 1 are more clearly illustrated in Fig. 5; the novel features of this portion of the circuit are the provision of a very efficient push-pull deflection circuit requiring only moderate amounts of power from the supply. The circuit consists of the oscillator tube V11*a* and V11*b* (sections of a triode such as the type 3A5 may be used) and a pair of inductance L2 and L3, which may be a center-tapped inductance, although the coupling between the two is not of essential importance herein; they may be physically separated if desired. One half of the dual tube, V11*a*, is employed as a blocking oscillator in much the same manner as described above in connection with Fig. 4, but such an oscillator will not provide sufficient output at the horizontal (line) frequency required, which is presently 15,750 per second. According to the invention, the second tube V11*b* (or second half of the dual triode) is connected as a feedback amplifier deriving its grid voltage through a capacitor C5 from the output of tube V11*a*; the output of V11*b* then not only provides additional deflection voltage, but improves the wave form of the current passing through L2.

In conventional circuits of this type in which a center-tapped inductance is used to provide push-pull deflection voltages, it is imperative that the coupling between halves of the inductance be extremely close and that the actual self-inductance be extremely high. In the circuit of this invention, on the other hand, the coupling need not be good, nor is it essential that there be any coupling. The second stage portion (V11*b*) is used to provide additional current of opposite polarity in the second half L3 of the inductance. In addition, and in the case where some coupling exists between L2 and L3, a portion of the output of tube V11*b* is fed back to the grid of the same tube, so that the output wave form may be made to follow the wave form on the grid. A suitable compensating network C7, R4 is inserted between the output of V11*a* and the grid of V11*b* so that the total output from plate to plate or across the total inductance may be made to have a more desirable wave shape than could be provided by the single amplifier V11*a* and transformer T3 alone. Specifically, in sawtooth circuits such as that shown the output of the second stage V11*b* may be made to compensate for the non-linearities which would normally exist in the output of V11*a* alone. At the same time, a considerable increase in the voltage available for deflection purposes is achieved. The suggested circuit parameters for this portion of the circuit are also tabulated at the end of this specification.

*Electron-coupled oscillator sweep circuit*

Fig. 6 of the drawings shows a modified form of oscillator of the electron-coupled type in which the parameters of the output circuit can be modified without affecting the frequency of oscillation. For example, the variable resistor R5 of Fig. 4 of the drawings is utilized to adjust the vertical height of the image produced by the picture tube, and variable resistor R3, which controls the free-running frequency of the oscillator, is the "vertical hold" control. However, in this circuit, and with relatively weak signals, the adjustment of R5 causes a change in the applied plate voltage which reacts upon the natural frequency of the timing circuit because of the varied inductance of transformer T2; thus these controls are not independent of one another.

In the arrangement shown in Fig. 6, a single tetrode or pentode tube such as the RTMA type 3Q4 is shown together with a usual blocking oscillator transformer T4, a charging condenser C9 and a charging resistor or charging inductance R7. The blocking oscillator transformer T4 is connected in the usual way for triode blocking oscillators except that the screen grid of the tube is used in the place of the plate of the usual triode. This part of the circuit performs the usual oscillator or timing function determining the free-running frequency of the circuit. In addition, the screen grid current under this type of operation is used to provide coupling to the electron stream existing between the cathode and the plate. This screen grid current will be relatively large, and thus will produce rather large changes in plate current.

The plate current will have essentially the same wave shape as the screen voltage. The blocking oscillator wave form will produce short high amplitude pulses of current in the plate circuit which in turn are used to discharge the capacitor C9. In conjunction with the charging resistance (or inductance) R7, the capacitor C9 will produce a sawtooth wave form of voltage the amplitude of which may be changed by changing either the value of the capacitor C9 or the resistor (or inductance) R7. Changes in these parameters will not affect the free-funning periodicity of the oscillator, since this latter is fixed by the values assigned to C10 and R8 in the timing circuit. Conveniently, the oscillator output may be taken from a secondary winding of a transformer T5 whose primary constitutes the inductance through which C7 is charged, but if desired the charging resistor or inductance may be separate elements.

Suitable values for the circuit components of Fig. 1 are as follows:

| | |
|---|---|
| C1, C2, C11, C20, C32 | 0.5 mfd. |
| C3, C8, C23, C24, C29, C30 | 0.005 mfd. |
| C5 | 500. mfd. |
| C6 | 100. mfd. |
| C7, C28 | 1500. mfd. |
| C10 | 0.25 mfd. |
| C12 | 30. mfd. |
| C13 | 6.5 mfd. |
| C14, C19, C21 | .01 mfd. |
| C15, C26 | 300. mfd. |
| C16 | 5. mfd. |
| C17 | 2000. nmfd. |
| C18 | 0.1 mfd. |
| C22 | 0.0025 mfd. |
| C25, C31 | 0.05 mfd. |
| C27 | 15 nmfd. |
| C33 | 0.03 mfd. |
| C34, C35 | 30 mfd. |
| C36 | 2000. mfd. |
| R1 | 1.8 megohms. |
| R2 | 33000 ohms. |
| R4, R28 | 1 megohm. |
| R5 | 6000 ohms. |
| R6, R31 | 470000 ohms. |
| R8, R15 | 47000 ohms. |
| R9, R14 | 1.2 megohms. |
| R10, R22 | 56000 ohms. |
| R11, R33 | 2.2 megohms. |
| R12 | 1 megohm contrast control. |
| R13 | 8,200 ohms. |
| R16, 98 | 4,000 ohms. |
| R17 | 47 ohms. |
| R18 | 27,000 ohms. |
| R19 | 3.9 megohms. |
| R20 | 2 megohms. |
| R21 | 120,000 ohms. |
| R23 | 51,000 ohms. |
| R24, R32, R34 | 150,000 ohms. |
| R25 | 10,000 ohms. |
| R26 | 1,800 ohms. |
| R27 | 50,000 ohms. |
| R29 | 1 megohm focus control. |
| R30 | 10 megohms. |
| R35 | Horizontal centering control. |
| R36, R37, R38, R39 | 6.8 megohms. |
| R40 | 10 ohms. |
| 94 | 1 ohm. |

While the invention has been disclosed in connection with a specific embodiment representing a preferred form, and in considerable detail, it is to be understood that the invention is not limited to such details except insofar as required by the scope of the appended claims.

What is claimed is:

1. Portable television receiving equipment operable selectively from an alternating current power line and from a low voltage direct current storage battery, and having self-contained means for recharging the storage battery from an alternating current power line, comprising: a transformer having at least three windings including a first winding adapted to be connected to an alternating current power line, a second winding arranged to provide an alternating current output of relatively high voltage, a rectifier connected to said second winding to provide rectified voltage for the plate supply of said receiver, and a third winding; a vibratory interrupter and a battery charging rectifier; switch means for connecting said third winding to said battery through said interrupter to excite said transformer by energy supplied by said battery, and switch means connecting said third winding through said charging rectifier to said battery to charge the same from said transformer when the latter is excited by said first winding.

2. A power supply system for portable electrical equipment comprising a transformer having a primary winding for energization from an alternating current source, a secondary winding, a rectifier connected to said secondary winding, a low voltage winding, a rectifier for said low voltage winding, a current-interrupting vibrator, a rechargeable battery, and switch means for selectively energizing said low voltage winding from said battery through said vibrator, and for connecting said low voltage winding to said battery through the last-named rectifier to recharge said battery from said low voltage winding when said transformer has its primary winding connected to an alternating current source.

References Cited in the file of this patent

UNITED STATES PATENTS

| | | |
|---|---|---|
| 1,615,098 | Purschel | Jan. 18, 1927 |
| 1,867,667 | Hubbard | July 19, 1932 |
| 1,957,016 | Loudon | May 1, 1934 |
| 2,236,066 | Poch | Mar. 25, 1941 |
| 2,273,709 | Jones | Feb. 17, 1942 |
| 2,313,915 | Bedford | Mar. 16, 1943 |
| 2,432,033 | Nicholson | Dec. 2, 1947 |
| 2,505,185 | Housman | Apr. 25, 1950 |
| 2,556,027 | Carson | Jan. 5, 1951 |
| 2,575,059 | La Via | Nov. 13, 1951 |
| 2,605,407 | Perkins | July 29, 1952 |